Patented Dec. 29, 1942

2,306,434

UNITED STATES PATENT OFFICE 2,306,434

METHOD OF APPLYING INSECTICIDES

Lyle D. Goodhue, Berwyn, Md., and William N. Sullivan, Washington, D. C., assignors to Claude R. Wickard, as Secretary of Agriculture of the United States of America, and to his successors in office No Drawing. Application March 31, 1941, Serial No. 386,058

2 Claims. (Cl. 21—58)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government, for governmental purposes, without the payment to us of any royalty thereon.

The object of our invention is to provide a method of making certain insecticides more effective when applied in the form of an aerosol. More specifically our invention has as its objective a method of dispersing an insecticide in the presence of a stable aerosol so that adsorption on the stable aerosol will take place and by this process the insecticide will be retained in a highly dispersed form which will be in contact with the insect for a much longer period than would be the case if the insecticide were dispersed where no stable aerosol was present.

A further object of our invention is to provide a method whereby better distribution can be obtained when an insecticide of medium volatility is dispersed in the atmosphere. Our process has as its objective the uniform coating with the insecticide of all surfaces of the insect and its habitat regardless of location or position.

Still another object is to provide a method by which relatively non-volatile fumigants can be kept suspended in the air by providing nuclei composed of non-volatile stable aerosol on which the insecticide can be condensed in such a way that only microscopic particles are formed whose rate of settling is so slow that the insecticide will be suspended for several hours where it can act as a fumigant in the same way as a gas or vapor.

Our invention relates to a method of suspending insecticides of low volatility in air by providing an infinite number of colloidal particles composing a stable aerosol on which the vapors of the insecticide can be condensed. By providing innumerable small particles as nuclei no large heavy particles are formed which would rapidly settle and clear the atmosphere. The presence of a stable aerosol prevents rapid growth of crystals or the formation of large droplets and in this way the insecticide is kept in an active form for a much longer period than would otherwise be the case if volatilization took place where no stable aerosol was present.

Smokes containing toxic materials such as derris, pyrethrum, sulfur, and nicotine have been used as insecticides for many years, but in this case the smoke was merely incidental to the volatilization process and was actually considered objectionable. Furthermore, no adsorption or suspension phenomena were proven or even suggested, and still further the insecticide was not volatilized after the smoke was produced, that is, not in the presence of previously prepared smoke or other stable aerosol.

By our invention we have definitely shown by our experiments that insecticides, volatilized in the presence of a stable aerosol, are much more effective.

A specific example of our invention is the suspension of naphthalene in air by volatilizing it in the presence of smoke produced by burning cornstalks with sodium nitrate. The cornstalk-sodium nitrate mixture is prepared by mixing 83 lbs. of ground cornstalks with 17 lbs. of sodium nitrate dissolved in enough water to thoroughly wet the mass. The mixture after drying completely is ready for use. Using the housefly as a test insect 160 g. of naphthalene were volatilized in 216 cu. ft. chamber (2 lbs. per 1000 cu. ft.) in the presence of smoke produced by previously burning 20 g. of the smoke mixture. The flies were exposed in cages for different periods during 50 minutes. Some flies were exposed for the first 20 minutes, then they were removed and fresh ones put in and exposed for 30 minutes. Some cages having solid covers on the top were introduced after 15 minutes and left for 35 minutes. After exposure the flies, in the same cages, were transferred to a specially equipped room where they were fed and mortality counts made according to well established procedures. The same exposures to naphthalene without smoke were made with fresh flies and a comparison of the results with and without smoke were made. The results are summarized in the table:

TABLE.—*The effectiveness against houseflies of vaporized naphthalene with and without smoke. A dosage of 2 pounds of naphthalene per 100 cu. ft. was used*

| Insecticidal material | Exposure period of flies, time interval | Protection | No. tests | No. insects used | Mortality in 24 hours |
|---|---|---|---|---|---|
| | Minutes | | | | Percent |
| Naphthalene | 0-20 | Covered [1] | 5 | 762 | 90 |
| | 15-50 | | 4 | 557 | 10 |
| | 20-50 | | 5 | 1,038 | 2 |
| | 0-20 | Uncovered | 5 | 1,531 | 99 |
| | 20-50 | | 5 | 2,012 | 3 |
| Naphthalene+aerosol.[2] | 0-20 | Covered | 5 | 848 | 99 |
| | 15-50 | | 4 | 838 | 71 |
| | 20-50 | | 5 | 1,174 | 17 |
| | 0-20 | Uncovered | 5 | 1,274 | 99 |
| | 20-50 | | 5 | 2,060 | 25 |
| Aerosol alone [2] | 0-35 | ___do___ | 2 | 1,587 | 1 |

[1] The top of the fly cage was covered with a board during tests as a protection to flies in the "covered tests"; the flies were unprotected from the falling naphthalene except for the wire screen top of cage in the case of the "uncovered tests."

[2] The aerosol was formed by burning 20 grams of mixture containing 83% cornstalks+17% sodium nitrate.

The results show the great increase in the effectiveness of naphthalene in the presence of smoke especially where the cages were protected by covers. The greatest difference shows up in the increase in the effective period.

This increase in effectiveness has been shown to exist in other experiments where larger enclosures were fumigated for flies, bed bugs, roaches, beetles and moths.

Other insecticides have also been dispersed in the presence of a stable aerosol. o-Dichlorobenzene in the presence of an aerosol made from oleic or lauric acid increased the kill of flies from 5% with no smoke, to 65% where the smoke was present. Two-thirds pound of o-dichlorobenzene was used per 1000 cu. ft.

Dispersed rotenone and pyrethrum were not effective, unless dispersed in the presence of a stable aerosol which in this case was made by spraying safrole on a heated surface. In the presence of a safrole aerosol 0.2 g. rotenone in a 1100 cu. ft. room killed 85% of houseflies and 100% mosquitoes.

Nicotine volatilized in the presence of a stable aerosol made by burning an inert vegetable material with a nitrate gave much better results than nicotine alone against aphids in greenhouse fumigation.

The materials cited in this specification are preferred but we in no way restrict ourselves to their use or to the specific quantities stated. The amount of smoke or inert aerosol as well as the quantity of insecticide may vary within limits depending on the use for which the preparation is intended.

Having thus described our invention, what we claim for Letters Patent is:

1. A process of fumigation which comprises the two steps of (1) forming a relatively insecticidally inert aerosol by the incomplete combustion of organic material (2) subsequently volatilizing in the presence of this aerosol an insecticidal material.

2. The process of dispensing an insecticide in aerosol form to increase its effective concentration comprising first forming an aerial suspension of a stable solid material in finely divided form as a carrier, thence dispersing the insecticide in aerosol form on the suspension, whereby the insecticide will collect on particles of the carrier material.

LYLE D. GOODHUE.
WILLIAM N. SULLIVAN.